US008731169B2

(12) United States Patent
DeLuca et al.

(10) Patent No.: US 8,731,169 B2
(45) Date of Patent: May 20, 2014

(54) CONTINUAL INDICATOR OF PRESENCE OF A CALL PARTICIPANT

(75) Inventors: Lisa Seacat DeLuca, San Francisco, CA (US); Dana L. Price, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 46 days.

(21) Appl. No.: 13/429,502

(22) Filed: Mar. 26, 2012

(65) Prior Publication Data

US 2013/0251124 A1 Sep. 26, 2013

(51) Int. Cl.
*H04M 3/42* (2006.01)

(52) U.S. Cl.
USPC ...................... 379/202.01; 379/257

(58) Field of Classification Search
USPC ............................. 379/202.01, 158
See application file for complete search history.

(56) References Cited

U.S. PATENT DOCUMENTS

| | | | |
|---|---|---|---|
| 6,327,364 B1 * | 12/2001 | Shaffer et al. | 379/265.02 |
| 6,658,091 B1 * | 12/2003 | Naidoo et al. | 379/37 |
| 7,076,245 B1 | 7/2006 | Satapathy | |
| 7,570,752 B2 * | 8/2009 | Jachner | 379/202.01 |
| 7,996,047 B2 | 8/2011 | Seier | |
| 8,019,078 B2 | 9/2011 | Chavez et al. | |
| 2005/0071440 A1 * | 3/2005 | Jones et al. | 709/218 |
| 2007/0173238 A1 * | 7/2007 | Ali-Vehmas | 455/416 |
| 2008/0267376 A1 * | 10/2008 | Khasnabish | 379/201.01 |
| 2009/0112589 A1 | 4/2009 | Hiselius et al. | |
| 2009/0147772 A1 | 6/2009 | Rao et al. | |
| 2011/0224987 A1 | 9/2011 | Gierach | |

OTHER PUBLICATIONS

CrackBerry.com, "Drop Call Indicator?—BlackBerry Forums at CrackBerry.com", Copyright 2012 Mobile Nations [online], [retrieved on Jan. 6, 2011]. Retrieved from the internet <url: http://forums.crackberry.com/blackberry-curve-8900-f100/drop-call-indicator-281154/>.
U.S. Appl. No. 12/272,839, entitled "Conference call degraded line detection and presentation" filed Nov. 18, 2008, abandoned Jul. 15, 2009.

* cited by examiner

*Primary Examiner* — Duc Nguyen
*Assistant Examiner* — Assad Mohammed
(74) *Attorney, Agent, or Firm* — David J. Zwick; Matthew Chung (57) ABSTRACT

Examples include a system, method and program for notifying presence of a phone call participant. In an example, a computer receives a request from a first calling device to connect with one or more second calling devices through a network. The computer provides a presence notification on the first calling devices wherein the presence notification provides a repeating indicator which represents that the one or more second calling devices are connected. The computer determines that the one or more second calling devices has disconnected and in response the computer ceases the presence notification on the first calling device.

16 Claims, 6 Drawing Sheets

CONTINUAL INDICATOR OF PRESENCE OF A CALL PARTICIPANT

FIELD OF THE INVENTION

The present invention relates generally to electronic communication and more specifically to the indication of dropped connectivity to participants of an electronic communication.

BACKGROUND

Electronic communication with the use of calling devices are used universally today. Electronic communications are typically conducted via a network, such as a phone or Voice over Internet Protocol (VoIP) network. During a normal electronic communication, one participant initiates a conversation using an electronic calling device, such as a telephone, with calling devices of other participants. Once the electronic communication is initiated by the participant, information that a call is being made is then sent to the network servers where information is mapped according to the number dialed. The call processor in charge of the network server assigns an IP address which determines the destination of the call. Soft switching, where information routes between different network servers connects the two devices and the recipient receives notification a call is waiting.

When a participant answers the calling device, the network server initiates the two channel connection which will allow for speech to travel between the two participants. One channel is for information arriving and the other channel is for information leaving. The two channel connection is part of the VoIP network. Calling devices which use a VoIP network include but are not limited to, VoIP business phones, smart phones, tablet computers and desk top computers. For conventional telephones running on plain old telephone service ("POTS"), the device used would be a land line telephone.

For VoIP networks, the amount of information which can be sent over a channel is measured in bandwidth. If the bandwidth falls below the minimum requirement of sustaining constant data transfer, the call will be interrupted due to latency, jitter or packet loss. Even if one of the two channels experiences a decrease in bandwidth, the participants will experience a loss of connectivity. In some examples, the interruption to the phone call is the connection cutting out in the middle of speech or the connection ending all together. This means sentences will be cut short and when the conversation is reinitiated, the two participants will not know what point to resume their conversation from.

SUMMARY

Aspects of the present invention disclose a method, computer system, and computer program product for the indication of dropped connectivity to participants of an electronic communication.

Examples include a system, method and program for notifying presence of a phone call participant. In an example, a computer receives a request from a first calling device to connect with one or more second calling devices through a network. The computer provides a presence notification on the first calling device. The presence notification provides a repeating indicator which represents that the one or more second calling devices are connected. The computer determines that the one or more second calling devices has disconnected, and in response the computer ceases the presence notification on the first calling device.

DETAILED DESCRIPTION

Figure 1:
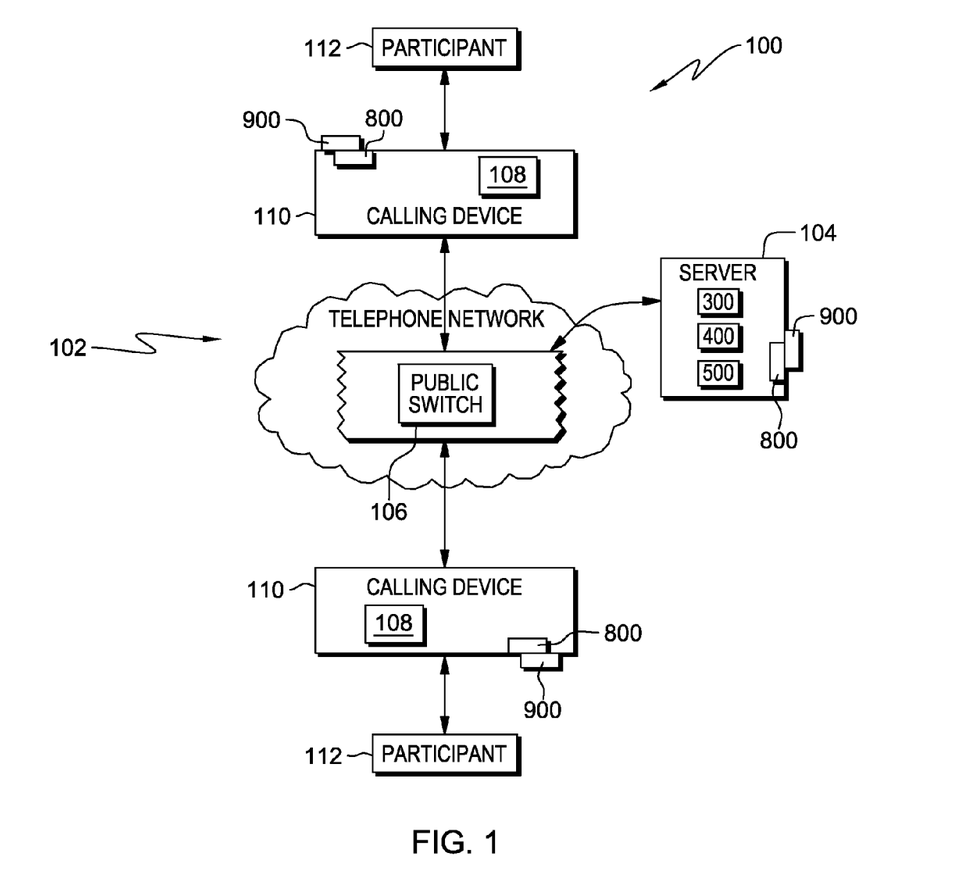
FIG. 1 depicts a presence notification system according to an embodiment of the present invention for indicating dropped connectivity to participant of an electronic communication.

The present invention will now be described in detail with reference to the figures. FIG. 1 depicts a telephone system generally designated 100 according to one embodiment of the present invention.

An example of telephone system 100 includes two or more calling devices 110 controlled by associated participants 112, and a server computer 104 connected through a telephone network 102. In the depicted example, telephone network 102 includes a public switch 106. Server computer 104 includes a participant notification preference program 300, which allows for participant 112 to select a presence notification through an user interface (UI) 108 on calling device 110. The server computer 104 includes a presence notification program 400 that notifies participant(s) 112 of the presence of other participant(s) 112 of the phone call. Server computer 104 also includes a participant presence monitoring program 500, which determines the amount of bandwidth available for a phone call between calling devices 110. User interface 108 allows for the presence notification to be customized by participant 112 and can be located on calling device 110, on server computer 104, and/or on an additional computer connected to server and/or calling devices through telephone network 102, or another network.

An exemplary telephone system 100 includes telephone network 102, which is the medium to provide telephonic communications between various calling devices 110 connected together through telephone system 100. Telephone network 102 may include, but is not limited to wired communications links, wireless communication links, satellite communication links and fiber optic cables. Telephone network 102 can connect participants 112 of a phone call though various calling devices 110. Calling devices 110 may be but are not limited to: a telephone, mobile phone, fax machine, personal digital assistant (PDA).

Before a phone call is initiated between two participants 112, the presence notification indicator is assigned to calling devices 110 of participants 112. Participant notification preference program 300 controlled by user interface 108 on calling device 110 can guide first participant 112 in selecting the presence notification of second participant 112. For example, participant notification preference program 300 divides the presence notification into groups including, but not limited to: participant basis, social networking relationship basis, organizational basis, default or a timeline basis. Such a presence notification may be but is not limited to an audible or visual alert. The presence notification will be continuously alerting first participant 112 in the form of a repeating indicator that second participant 112 is still connected. First participant 112 will begin by opening user interface 108 and selecting from the preordained list the type of phone call that will occur with second participant 112. The information about the type of phone call will be attached to the phone number first participant 112 dials.

At this time, first participant 112 controlling calling device 110 initiates a call by dialing a number to a known destination of calling device 110 controlled by second participant 112. Calling devices 110 can be connected to public switch 106 in telephone network 102. Public switch 106 performs the process of connecting a call once a number is dialed on calling device 110 to connect with a remote calling device 110. The process includes receiving the number dialed by first calling device 110, analyzing the number by determining the location of second calling device 110 and finally routing the number through telephone network 102. In another example, calling device 110 can also be connected to telephone network 102 through a Private Branch Exchange ("PBX"). PBX is an in-house telephone switching system that interconnects calling device extensions to each other, as well as to an outside telephone network 102. In some examples, PBXs use all-digital methods of switching and can support both digital terminals and telephones, along with analog telephones. Examples of PBX may be but is not limited to: Hosted and Circuit Switched PBX, Private and Packet Switched PBX, IP Centrex, and Hosted and Packet Switched PBX.

Server computer 104 controls telephone network 102 including public switch 106. Telephone network 102 controls the routing commands given to public switch 106. In some examples, server computer 104 performs the entire phone routing without public switch 106. Server computer 104 has the ability to house the implemented computer programs. Once the associated information with the number which was dialed has reached server computer 104, participant notification preference program 300 selects the indicator which will be used by first participant 112 once the call has connected with second participant 112. Finally, the call is sent to second calling device 110 where second participant 112 connects with first participant 112 by accepting the call.

When calling devices 110 are connected the presence notification will be constantly present until participants 112 decide to end the conversation and terminate the connection. In one example, the repeating indicator of the presence notification is produced by the server computer 104. In another example, calling device 110 of the first participant and/or second participant 112 produces the repeating indicator. In assuring the presence notification is active only when calling devices 110 are connected, in one example, participant presence monitoring program 500 monitors the amount of bandwidth available for the two channel connection between calling devices 110. The purpose of measuring the bandwidth is to determine whether the minimum required amount of bandwidth is met to sustain an uninterrupted phone call. When the minimum requirement is met, participant presence monitoring program 500 implements the presence notification. If the minimum requirement is not met, participant presence monitoring program 500 will stop implementing the presence notification and a connection between calling devices 110 will have to be re-established by participants 112. Participant presence monitoring program 500 determines when a disconnection has occurred of either first calling device 110 or second calling device 110. Such a program will also allow first participant 112 to know when a connection cuts out in the middle of second participant 112 speech due to factors including, but not limited to: network overload, failure, latency problems, or jitter where speech fragments may arrive out of order.

Furthermore, once participants 112 of the phone call determine the conversation is complete, they can cease the phone call connection. This will send a signal from calling device 110 of participant 112 to server computer 104 in telephone network 102. Presence notification program 400 determines the connection has been terminated by participant 112 rather than by the lack of bandwidth available and will end the two channel connection between two calling devices 110. Ending the two channel connection will also end the presence notification being received by calling devices 110.

In order to input a preference, calling device 110 has to have user interface 108 where participant can select the presence notification indicator. Participant notification preference program 300 will run user interface 108 on calling device 110. An example of user interface 108 would include a display on calling device 110 which participant 112 can use before the phone call initiates or have a random presence notification assigned. The display will present the list of contacts and under each contact there may be a sub-menu regarding the types of indicators of the presence notifications. Furthermore, once the indicator has been selected, user may be able to choose different styles of indicators desired to assign to second calling device 110 of the phone call. Another example includes user interface 108 located on an additional computer connected to server computer 104, or a user interface associated with server computer 104. In an example, additional computer contains participant notification preference program 300 where user inputs preferences, and preferences are stored on server computer 104.

In examples, the presence notification is selected from a preordained list of indicators, which may be subject to change. The preordained list may include, but is not limited to: an audible or visual indication. An example of an audible indication includes nonintrusive music playing in the background that would not deter from clearly hearing the speech of participant 112 using calling device 110. Nonintrusive means the speech of participant 112 remains clear and distinct while the audible presence notification is active. Another example of an audible indication would be a nonintrusive white noise, which is a distinct enough indication of the presence of another participant 112. In an example, for a phone call with three or more participants 112, different and distinct sounds can be assigned to each calling device 110 which is connected. For example, first calling device 110 can have "beep" assigned, second calling device 110 can have "ding" assigned and so on. The single sound emitted from calling devices 110 would constantly loop to inform participants 112 who is still connected to the phone call. The visual indication can be built into the display of calling device 110 or can be an external visual indicator that is connected to calling device 110. The visual indicator will be distinct enough for participant 112 of the phone call to know immediately when the connection has ceased so the conversation can be re-established from the point which the connection failed.

Figure 2:
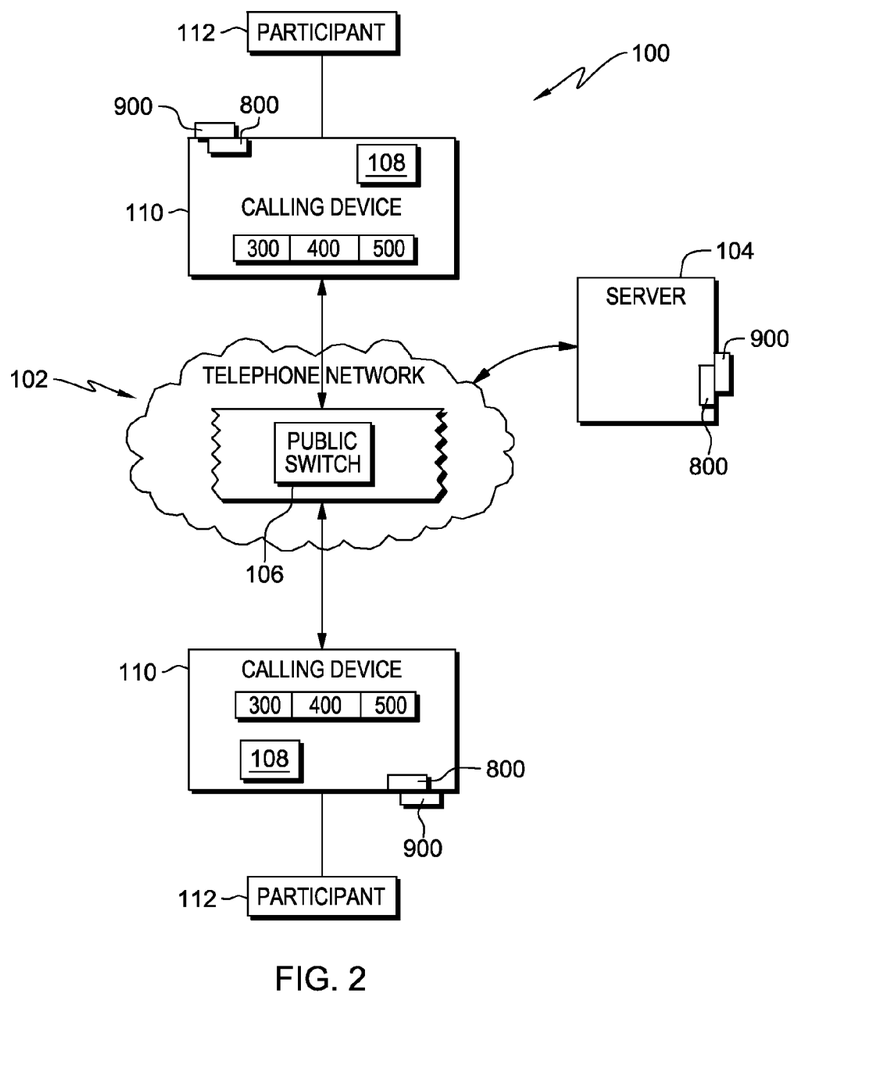
FIG. 2 depicts a presence notification system according to another embodiment of the present invention for indicating dropped connectivity to participant of an electronic communication.

FIG. 2 depicts another example of a telephone system generally designated 100 according to one embodiment of the present invention. An example of telephone system 100 includes two or more calling devices 110 controlled by associated participants 112, and a server computer 104 connected through a telephone network 102. In the depicted example, telephone network 102 includes a public switch 106. Calling devices 110 include a participant notification preference program 300, which allows for participant 112 to select a presence notification through user interface 108 on calling device 110. Calling devices 110 include a presence notification program 400 that notifies participant(s) 112 of the presence of other participant(s) 112 of the phone call. Calling devices 110 also include a participant presence monitoring program 500, which determines the amount of bandwidth available for a phone call between calling devices 110. User interface 108 allows for the presence notification to be customized by participant 112 and can be located on calling device 110, on server computer 104, and/or on an additional computer connected to server and/or calling devices through telephone network 102, or another network.

Figure 3:
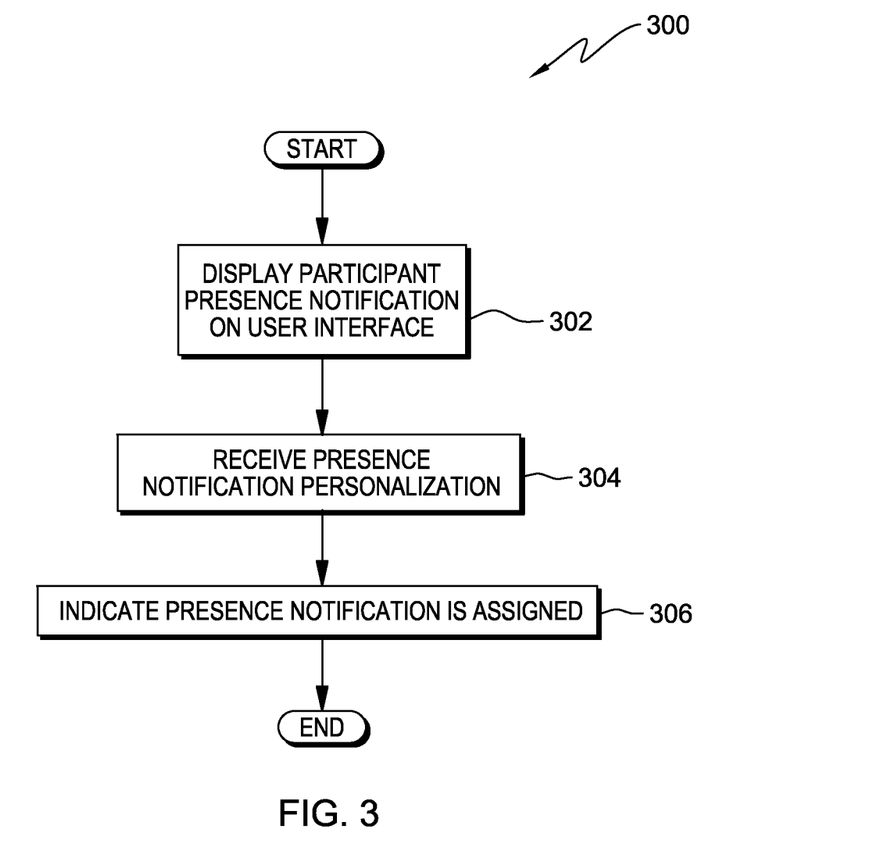
FIG. 3 is a flow chart illustrating the steps of an exemplary program for selecting notification preference.

FIG. 3 is participant notification preference program 300 allowing participant 112 to select a presence notification through user interface 108. Participant notification preference program 300 providing user interface 108 can be implemented on existing calling device 110 or it can be selected through server computer 104 which can save the preferences across many calling devices 110. In Step 304, participant notification preference program 300 receives participant presence notification preferences, after participant notification preference program 300 displays user interface 108 where participant 112 has the ability to select the presence notification for second calling device 110 (Step 302). The presence notification acts as an alert for participants for when calling device 110 of a phone call disconnects. In Step 306, once the presence notification is specified, participant notification preference program 300 indicates the presence notification is assigned to second calling device 110. In response to user initiating a call with calling device 110 that has a presence notification assigned, a presence notification is initiated once participant 112 is finished dialing the number of second calling device 110. In other examples, the presence notification can also be provided by server computer 104 through third party providers or streaming applications. The presence notification can be assigned to a certain calling device at the time of the call or at a previous time before the phone call is established.

Figure 4:
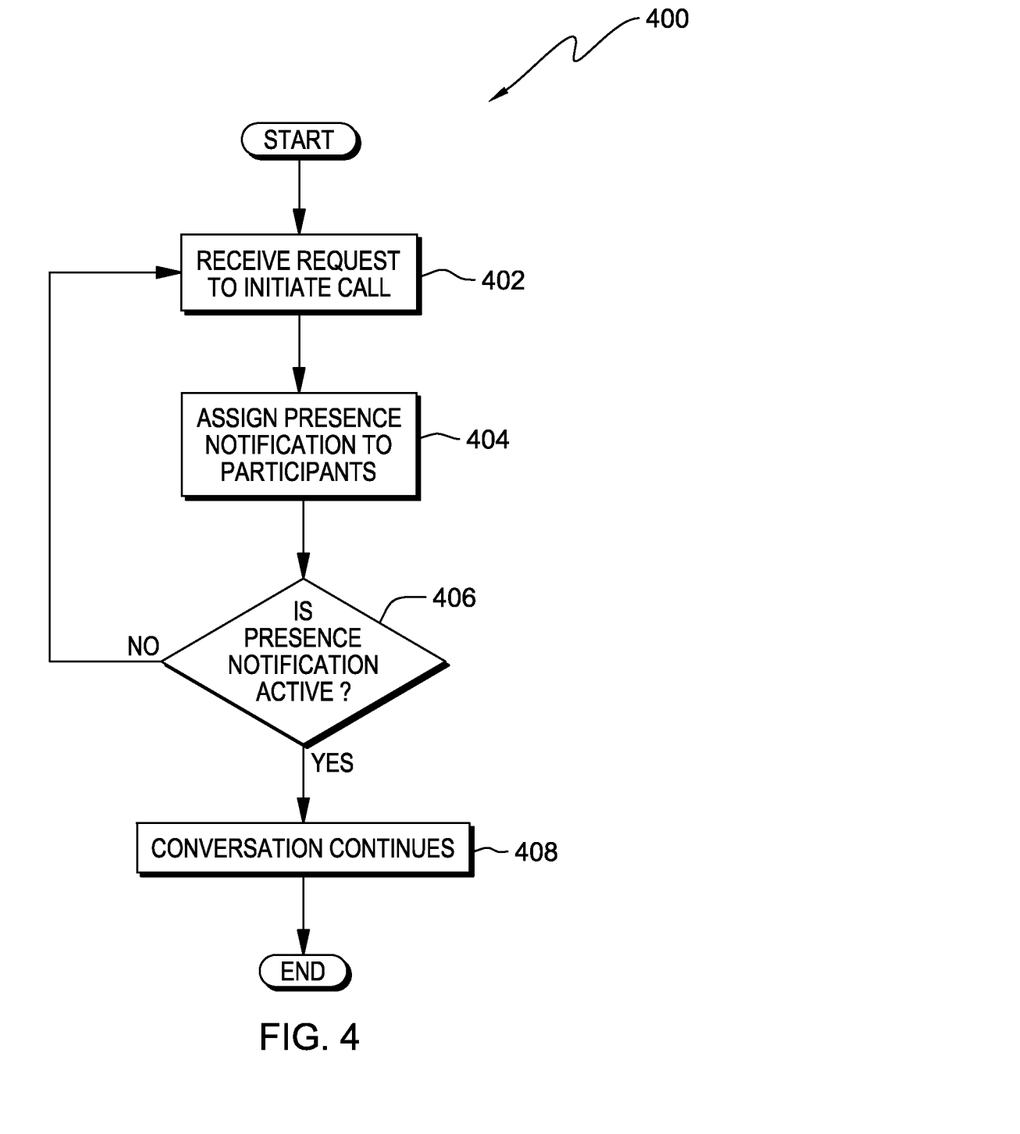
FIG. 4 is a flow chart illustrating the steps of an exemplary program for participant presence notification.

FIG. 4 is presence notification program 400 implementing an embodiment of the invention in calling device 110. In Step 402, a phone call is initiated by first calling device 110 to establish a connection with second calling device 110. In Step 404, once a connection is established between calling devices 110, presence notification program 400 assigns the preordained presence notifications to second calling device 110. In Step 406, presence notification program 400 determines whether the presence notification is active. If second calling device 110 no longer has an active presence notification (no branch of decision 406), presence notification program 400 re-initiates the phone call on first calling device 110 which no longer receives the presence notification. In response to second calling device 110 having an active presence notification (yes branch of decision 406), the phone call continues between participants 112, (step 408). The phone call will continue until first and/or second participant 112 ends the phone call by manually disconnecting their calling device 110. Ending the phone call will de-activate the presence notification on both calling devices 110.

Another exemplary embodiment of presence notification program 400 begins with Step 402, a phone call initiated between first and second calling devices 110. In Step 404, once the connection is established between both calling devices 110, presence notification program 400 assigns the preordained presence notification to both, first and second calling devices 110. It is to be noted, first participant 112 may not have the presence notification program 400 implemented on first calling device 110 but second participant 112 will still be able to hear the presence notification of first participant 112 as long as presence notification program 400 is implemented on second calling device 110. In Step 406, presence notification program 400 determines whether the presence notification is active. If either calling device 110 no longer has an active presence notification (no branch of decision 406), presence notification program 400 re-initiates the phone call on calling device 110 which no longer receives the presence notification. In response to both calling devices 110 having an active presence notification (yes branch of decision 406), the phone call continues between both participants 112 (step 408). The phone call will continue until either participant 112 ends the phone call by manually disconnecting their calling device 110. Ending the phone call will de-activate the presence notification on both calling devices 110.

Figure 5:
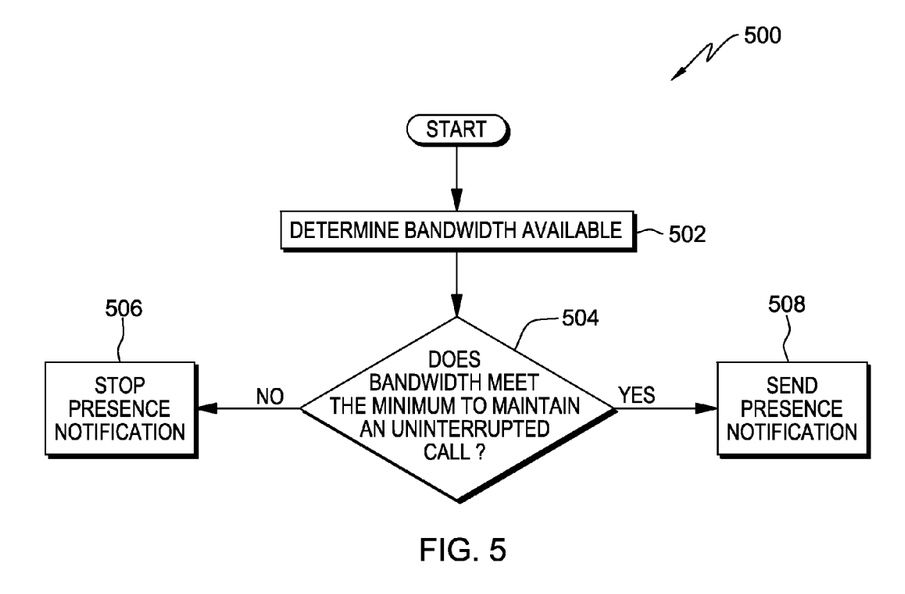
FIG. 5 is a flow chart illustrating the steps of an exemplary program for monitoring participant presence.

FIG. 5 is a participant presence monitoring program 500 which determines the amount of bandwidth available for a phone call. In order to insure participants 112 are aware the phone call is cutting out, participant presence monitoring program 500 determines if the connection can support a steady conversation. In Step 502, participant presence monitoring program 500 determines the amount of bandwidth available on the two channel connection. In step 504, participant presence monitoring program 500 determines if the minimum bandwidth to sustain an uninterrupted call exists on both of the connected channels. In response to determining that minimum bandwidth to sustain an uninterrupted phone call does not exist (no branch of decision 504), the presence notification will stop being sent to calling device 110 (step 506). In response to determining that minimum bandwidth to sustain an uninterrupted call exists (yes branch of decision 504), the presence notification will continue being sent to calling device 110 (step 508).

Figure 6:
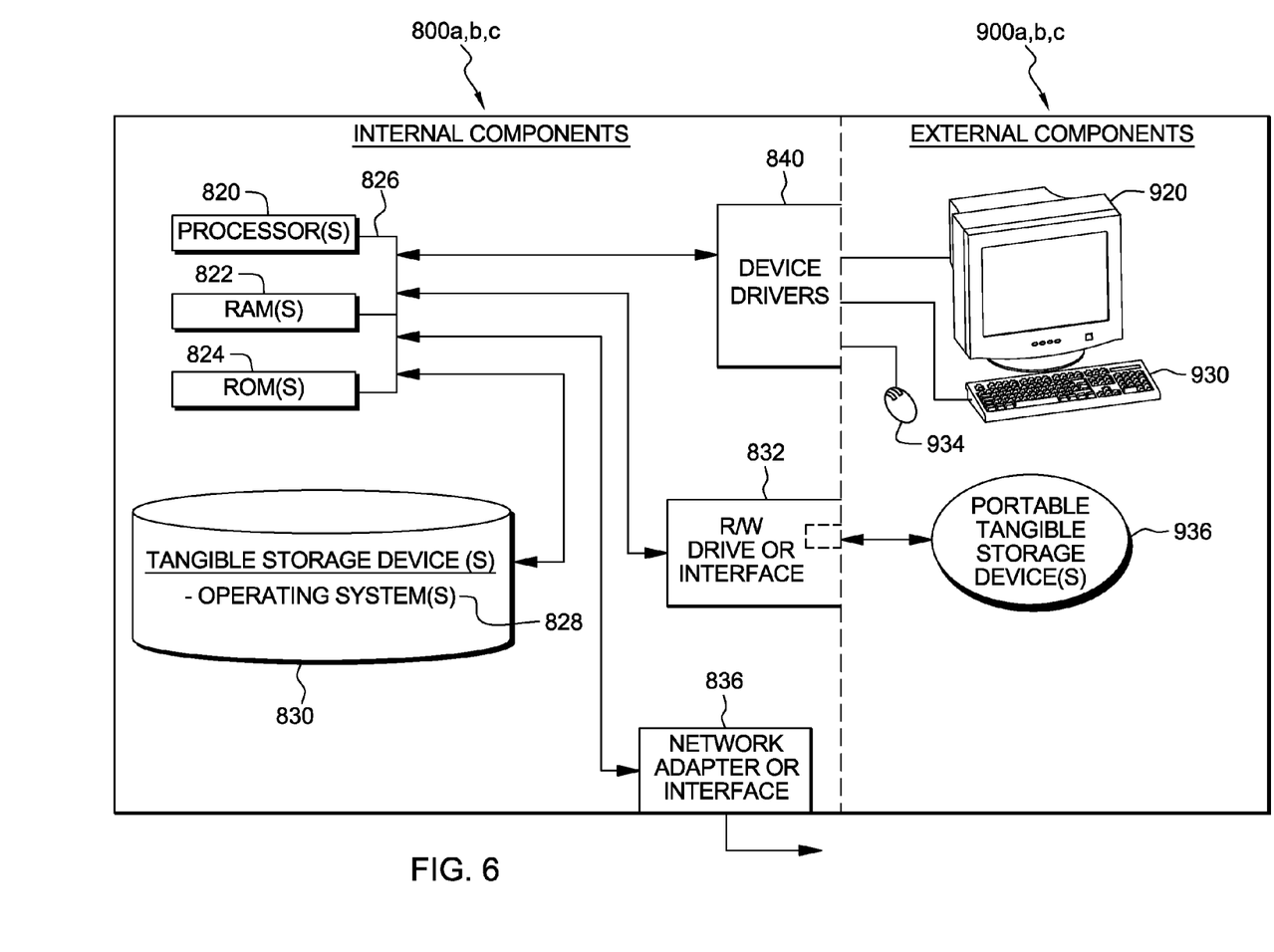
FIG. 6 is a block diagram of components of computers of FIGS. 1 and 2 (such as a calling device or server computer) depicted in accordance with an illustrative embodiment.

FIG. 6 shows a block diagram of internal components 800 and external components 900 of a calling device 110 and server computer 104 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Computer system 800, 900 is representative of any electronic device capable of executing machine-readable program instructions. Computer system 800, 900 may be representative of a smart phone, a computer system, PDA, or other electronic devices. Examples of computing systems, environments, and/or configurations that may represented by computer system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Calling device 110 and server computer 104 include respective sets of internal components 800 a, b, c and external components 900 a, b, c illustrated in FIG. 6. Each of the sets of internal components 800 a, b, c includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs 300, 400 and 500 in calling device 110 and in server computer 104 are stored on one or more of the respective computer-readable tangible storage devices 830 for execution by one or more of the respective processors 820 via one or more of the respective RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 *a, b, c* also includes a R/W drive or interface 832 to read from and write to one or more portable computer-readable tangible storage devices 936 such as a CD-ROM, DVD, memory stick, magnetic tape, magnetic disk, optical disk or semiconductor storage device. The programs 300, 400 and 500 in calling device 110 and in server computer 104 can be stored on one or more of the respective portable computer-readable tangible storage devices 936, read via the respective R/W drive or interface 832 and loaded into the respective hard drive 830.

Each set of internal components 800 *a, b, c* also includes network adapters or interfaces 836 such as a TCP/IP adapter cards, wireless wi-fi interface cards, or 3G or 4G wireless interface cards or other wired or wireless communication links. The programs 300, 400 and 500 in calling device 110 and in server computer 104 can be downloaded to respective computer systems from an external computer via a network (for example, the Internet, a local area network or other, wide area network) and respective network adapters or interfaces 836. From the network adapters or interfaces 836, the programs 300, 400 and 500 in calling device 110 and in server computer 104 are loaded into the respective hard drive 830. The network may comprise copper wires, optical fibers, wireless transmission, routers, firewalls, switches, gateway computers and/or edge servers.

Each of the sets of external components 900 *a, b, c* can include a computer display monitor 920, a keyboard 930, and a computer mouse 934. External components 900 *a, b, c* can also include touch screens, virtual keyboards, touch pads, pointing devices, and other human interface devices. Each of the sets of internal components 800 *a, b, c* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

The foregoing description of various embodiments of the present invention has been presented for purposes of illustration and description. It is not intended to be exhaustive nor to limit the invention to the precise forms disclosed. Many modifications and variations are possible. Such modifications and variations that may be apparent to a person skilled in the art of the invention are intended to be included within the scope of the invention as defined by the accompanying claims.

What is claimed is:

1. A method for notifying presence of a phone call participant, the method comprising:
    a computer connecting a first calling device with two or more second calling devices through a network;
    the computer providing presence notifications on the first calling device, each presence notification being a different audible indicator representing each of the two or more second calling devices, the presence notifications being played in a loop on the first calling device; and
    in response to the computer disconnecting one of the two or more second calling devices, the computer removing from the loop on the first calling device a presence notification representing the calling device that has been disconnected.

2. The method of claim 1, wherein the network includes one or more of: a public switch, a public branch exchange, and a network server.

3. The method of claim 1, wherein the first calling device and the two or more second calling devices include one or more of: a cell phone, a telephone, a VoIP telephone, a computer, and a PDA.

4. The method of claim 1, wherein one or more of the different audible indicators are determined based at least upon a user preference associated with a respective one or more of the second calling devices.

5. The method of claim 1, further comprising:
    the computer determining if a bandwidth of a connection has fallen below a predetermined minimum threshold; and
    responsive to the bandwidth of the connection falling below the predetermined minimum threshold, the computer removing the presence notifications from the first calling device corresponding to the two or more second calling devices.

6. The method of claim 1, further comprising:
    in response to the computer connecting a first calling device with two or more second calling devices, assigning a presence notification for each of the two or more second calling devices.

7. A computer program product for notifying presence of a phone call participant, the computer program product comprising the steps of:
    one or more computer-readable, hardware storage devices and program instructions stored on at least one of the one or more hardware storage devices, the program instructions comprising:

program instructions to connect a first calling device with two or more second calling devices through a network;

program instructions to provide presence notifications on the first calling device, each presence notification being a different audible indicator representing each of the two or more second calling devices, the presence notifications being played in a loop on the first calling device; and program instructions, responsive to the computer disconnecting one of the two or more second calling devices, the computer removing from the loop on the first calling device a presence notification representing the calling device that has been disconnected.

8. The computer program product of claim 7, wherein the network includes one or more of: a public switch, a public branch exchange, and a network server.

9. The computer program product of claim 7, wherein the first calling device and the two or more second calling devices include one or more of: a cell phone, a telephone, a VoIP telephone, a computer, and a PDA.

10. The computer program product of claim 7, wherein one or more of the different audible indicators are determined based at least upon a user preference associated with a respective one or more of the second calling devices.

11. The computer program product of claim 7, further comprising:

program instructions to determine if a bandwidth of a connection has fallen below a predetermined minimum threshold; and responsive to the bandwidth of the connection falling below the predetermined minimum threshold, program instructions to removing the presence notifications from the first calling device corresponding to the two or more second calling devices.

12. The computer program product of claim 7, further comprising:

in response to the computer connecting a first calling device with two or more second calling devices, program instructions to assign a presence notification for each of the two or more second calling devices.

13. A computer system for notifying presence of a phone call participant, the system comprising:

one or more processors, one or more computer-readable memories, and one or more computer-readable hardware storage devices;

program instructions, stored on at least one of the one or more storage devices for execution by at least one of the one or more processors via at least one of the one or more memories, to connect a first calling device with two or more second calling devices through a network;

program instructions, stored on at least one of the one or more storage devices for execution by at least one of the one or more processors via at least one of the one or more memories, to provide presence notifications on the first calling device, each presence notification being a different audible indicator representing each of the two or more second calling devices, the presence notifications being played in a loop on the first calling device; and program instructions, stored on at least one of the one or more storage devices for execution by at least one of the one or more CPUs via at least one of the one or more memories, responsive to the computer disconnecting one of the two or more second calling devices, the computer ceasing removing from the loop on the first calling device a presence notification representing the calling device that has been disconnected.

14. The computer system of claim 13, wherein one or more of the different audible indicators are determined based at least upon a user preference associated with a respective one or more of the second calling devices.

15. The computer system of claim 13, further comprising:

program instructions, stored on at least one of the one or more storage devices for execution by at least one of the one or more processors via at least one of the one or more memories to determine if a bandwidth of a connection has fallen below a predetermined minimum threshold; and program instructions, stored on at least one of the one or more storage devices for execution by at least one of the one or more processors via at least one of the one or more memories responsive to the bandwidth of the connection falling below the predetermined minimum threshold, to remove the presence notifications from the first calling device corresponding to the two or more calling devices.

16. The computer system of claim 13, further comprising:

in response to the computer connecting a first calling device with two or more second calling devices, program instructions to assign a presence notification for each of the two or more second calling devices.

* * * * *